US012029984B2

(12) United States Patent
Benedetto et al.

(10) Patent No.: US 12,029,984 B2
(45) Date of Patent: Jul. 9, 2024

(54) IN-GAME ASSET TRACKING USING NFTs THAT TRACK IMPRESSIONS ACROSS MULTIPLE PLATFORMS

(71) Applicant: Sony Interactive Entertainment Inc., Tokyo (JP)

(72) Inventors: Warren Benedetto, San Mateo, CA (US); Yiwei Yang, San Francisco, CA (US); Daniel Steven Hiatt, San Francisco, CA (US); Charles Denison, Piedmont, CA (US); Joshua Santangelo, San Francisco, CA (US); Matthew Tomczek, Oakland, CA (US); Jonathan Webb, Sausalito, CA (US); Benjamin Andrew Rottler, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 217 days.

(21) Appl. No.: 17/393,052

(22) Filed: Aug. 3, 2021

(65) Prior Publication Data
US 2023/0042269 A1 Feb. 9, 2023

(51) Int. Cl.
*A63F 13/65* (2014.01)
*A63F 13/79* (2014.01)
*A63F 13/80* (2014.01)
*G06N 20/00* (2019.01)

(52) U.S. Cl.
CPC ............. *A63F 13/65* (2014.09); *A63F 13/79* (2014.09); *A63F 13/80* (2014.09); *G06N 20/00* (2019.01); *A63F 2300/556* (2013.01); *A63F 2300/69* (2013.01)

(58) Field of Classification Search
CPC .......... A63F 13/65; A63F 13/79; A63F 13/80; A63F 2300/556; A63F 2300/69; G06N 20/00
See application file for complete search history.

(56) References Cited

U.S. PATENT DOCUMENTS

| 11,075,891 | B1 | 7/2021 | Long et al. | |
| 11,154,783 | B1 * | 10/2021 | Koch | A63F 13/352 |
| 11,582,316 | B1 * | 2/2023 | Danyi | H04L 67/535 |
| 11,748,568 | B1 * | 9/2023 | Orhan | G06F 40/284 |
| | | | | 709/224 |
| 2019/0282906 | A1 | 9/2019 | Yong | |

(Continued)

FOREIGN PATENT DOCUMENTS

WO 2020092900 A2 5/2020

OTHER PUBLICATIONS

"International Search Report and Written Opinion", dated Jan. 3, 2023, from the counterpart PCT application PCT/US22/074461.

*Primary Examiner* — James S. McClellan
*Assistant Examiner* — Ross A Williams
(74) *Attorney, Agent, or Firm* — John L. Rogitz; John M. Rogitz

(57) ABSTRACT

Data processing/GUIs for NFT block chain data to "tell the story" of ownership or highlight "cool" aspects of a computer game-related NFT in simplified way. Machine learning (ML) may be used to boil down the complexity of data to what people need or want to understand. The displayed timeline of ownership as presented in a GUI can be interactive. Types of metadata to encapsulate in the NFT are discussed.

20 Claims, 5 Drawing Sheets

(56) References Cited

U.S. PATENT DOCUMENTS

Figure 1:
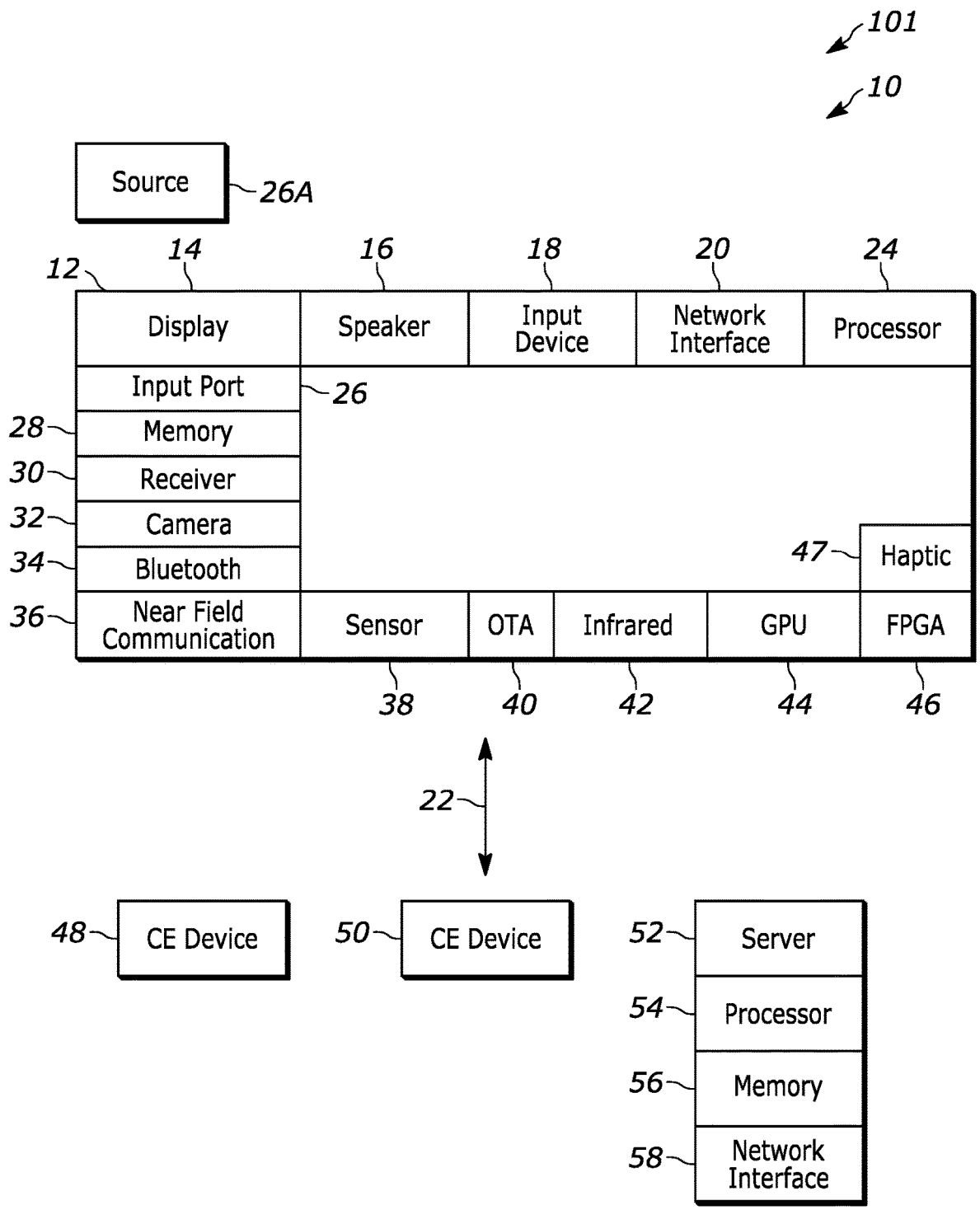

| | | | |
|---|---|---|---|
| 2020/0349625 A1 | 11/2020 | Madhuram et al. | |
| 2021/0192620 A1* | 6/2021 | Golomb | G06N 20/20 |
| 2021/0295243 A1* | 9/2021 | Tang | G06Q 40/03 |
| 2021/0342836 A1* | 11/2021 | Cella | H04L 9/3239 |
| 2021/0390531 A1* | 12/2021 | Voorhees | G06Q 20/065 |
| 2022/0210061 A1* | 6/2022 | Simu | G06Q 20/3829 |
| 2022/0261882 A1* | 8/2022 | Youb | G06Q 20/065 |
| 2022/0318852 A1* | 10/2022 | Blaikie, III | G06Q 30/0255 |
| 2022/0318853 A1* | 10/2022 | Blaikie, III | G06Q 30/0255 |
| 2022/0366494 A1* | 11/2022 | Cella | G06Q 30/0201 |
| 2023/0036694 A1* | 2/2023 | Coughlan | G06Q 20/38215 |
| 2023/0132804 A1* | 5/2023 | Chen | A63F 13/65 |
| | | | 705/14.12 |
| 2023/0138023 A1* | 5/2023 | Yang | A63F 13/79 |
| | | | 463/42 |

\* cited by examiner

IN-GAME ASSET TRACKING USING NFTs THAT TRACK IMPRESSIONS ACROSS MULTIPLE PLATFORMS

FIELD

The present application relates generally to In-Game Asset tracking using NFTs that track impressions across multiple platforms.

BACKGROUND

Non-fungible tokens (NFT) are the digital world's version of physical collectables, such as but not limited to artwork. An NFT is a digital file in a block chain that proves who owns the underlying digital asset, much as a sales receipt proves ownership of a physical painting, although forging NFT proof-of-ownership is nearly impossible owing to the use of block chain technology. Like a print or painting, ownership of an NFT does not necessarily include copyright in the original work, which copyright may be retained by the creator. While anyone can view the digital asset, only the person identified in the NFT can sell the ownership of the asset, which then is recorded in the block chain. Thus, digital assets can be bought and sold like physical collectables through NFT transactions.

SUMMARY

As understood herein, in some applications, for example, computer simulations such as computer games, a player or spectator might find it interesting who has possessed an NFT related to the game in the past, in a clean, intuitive presentation. Such an NFT may facilitate tracking gamer/spectator impressions.

Accordingly, a system includes at least one computer medium that is not a transitory signal and that in turn instructions executable by at least one processor to input to at least a first machine learning (ML) model at least one non-fungible token (NFT) representing at least one digital asset related to at least one computer simulation. The instructions are executable to receive from the ML model information from the NFT indicating aspects of a lifetime of the NFT, and to present on at least one computer display the information.

In example embodiments the instructions can be executable to receive from the ML model information from the NFT indicating aspects of a lifetime of the NFT. The information from the NFT may be derived from some but not all metadata associated with the NFT.

In some implementations the instructions can be executable to present on at least one computer display the information from the NFT. The information may include at least one user interface (UI) that presents a list of at least some owners of the NFT. In some examples, the UI presents a respective period for which each respective owner owned the NFT. In non-limiting embodiments the UI presents a respective game and/or game scene associated with acquisition of the NFT by the respective owner. If desired, the UI can present a respective event in a game associated with acquisition of the NFT.

In some embodiments, the instructions can be executable to, responsive to selection from the UI, present a secondary UI surfacing elements of the information related to the selection.

In examples, the instructions may be executable to present on at least one computer display the information from the NFT in a UI that presents a timeline which includes spikes each of which represents an important event in the NFT. In such examples, the instructions may be executable to receive selection of a first spike in the timeline, and responsive to the selection, present a secondary UI presenting information associated with the first spike.

In another aspect, a method includes inputting to at least one machine learning (ML) model at least one training set of data including metadata of non-fungible tokens (NFT) associated with computer simulation assets and ground truth interesting elements therein. The method includes training the ML model using the training set. Subsequent to training, the method includes inputting to the ML model at least one NFT comprising metadata and presenting metadata output by the ML model for a user to hear or visualize or feel important events in a life of the NFT.

If desired, user feedback can be added into the ML model to continuously improve the model over time. User feedback could be: viewable impressions, focus events, click events etc.

In another aspect, an assembly includes at least one display and at least one processor programmed with instructions to present on the display information associated with at least one non-fungible token (NFT) derived to represent at least one digital asset in a computer game.

The details of the present application, both as to its structure and operation, can be best understood in reference to the accompanying drawings, in which like reference numerals refer to like parts, and in which:

BRIEF DESCRIPTION OF THE DRAWINGS

FIG. 1 is a block diagram of an example system including an example in accordance with present principles;

FIG. 2 schematically illustrates an NFT;

FIGS. 3-5 illustrate example user interfaces (UI) consistent with present principles;

FIG. 6 illustrates example logic in example flow chart format;

FIG. 7 illustrates a training set of NFT metadata with ground truth "interesting" elements being used to train a machine learning (ML) model; and FIGS. 8 and 9 illustrate additional example UIs.

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
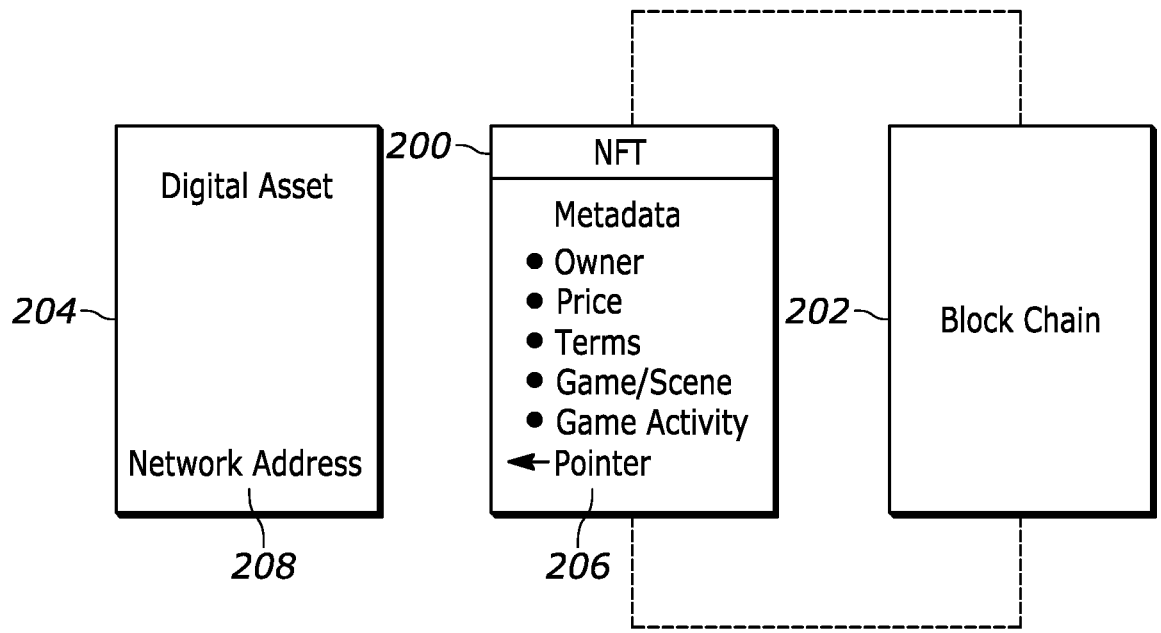

FIG. 2 illustrates a data structure 200 configured for inclusion in a block chain 202. The data structure 200 in the embodiment shown is configured as a non-fungible token (NFT) that relates to or is derived from a digital asset 204, such as an image, an audio recording, a game event, or other digitally-embodied asset that typically is generated or composed by an artist. In example implementations, the digital asset 204 may be from a computer simulation, such as a computer game, and may represent a game character, weapon, plot, or other aspect of the computer game such as an event.

In some cases, the digital asset 204 may be encoded as part of the data structure 200 (hereinafter for brevity, "NFT 200") for inclusion into the block chain 200 or may be stored separately from the NFT 200 per se, in which case the NFT 200 may include a pointer 206 to a network address 208 of the digital asset 204.

The NFT 200 typically includes metadata 210 indicating ownership of the NFT 200 and hence of the digital asset 204. The metadata may include indication of the current and if desired past owners of the NFT 200, the price(s) paid for the ownership or other means by which ownership was acquired, the terms of the ownership (e.g., whether copyright does or does not accompany ownership), length of ownership, whether ownership can be transferred during the temporary period of ownership, etc.

Figure 3:
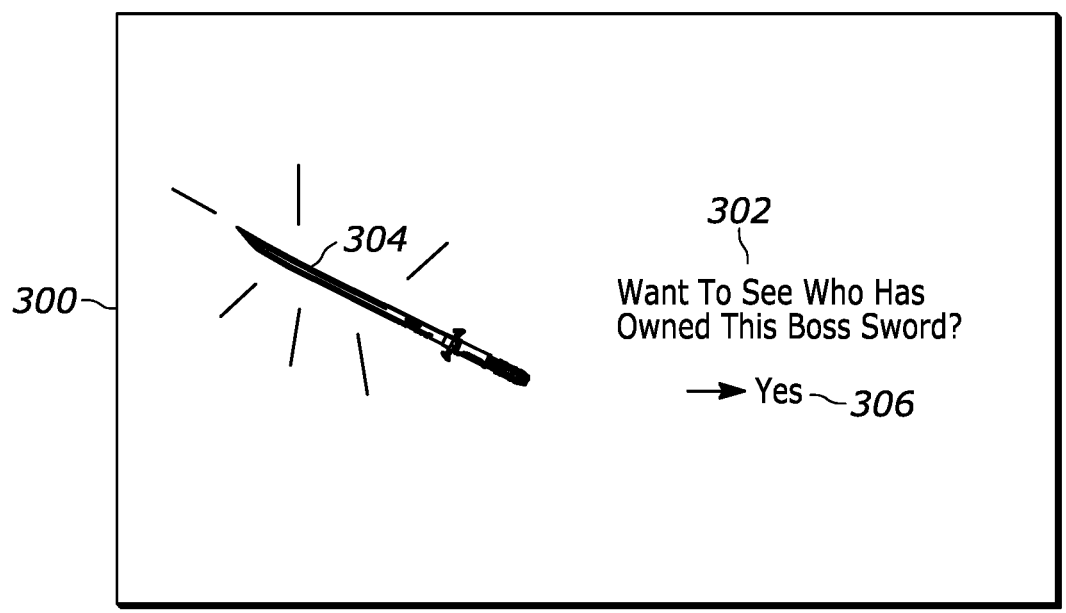

FIG. 3 illustrates a UI that may be presented on a display 300 such as any display herein to prompt, at 302, whether the user would like to view (or hear) a story of a digital asset, in this case, an image 304 of a weapon ("boss sword"), who owned it, etc. For example, the image 304 may be of a weapon that a famous streamer used to kill the character of another famous streamer in a computer game.

The digital asset is associated with an NFT. The NFT may include metadata concerning the digital asset as described in reference to FIG. 2 and as further described below, and the metadata can be mined to present the user with a story of the asset in a clean, interesting manner. The user may select a "yes" selector 306 to see the story of the asset.

Figure 4:
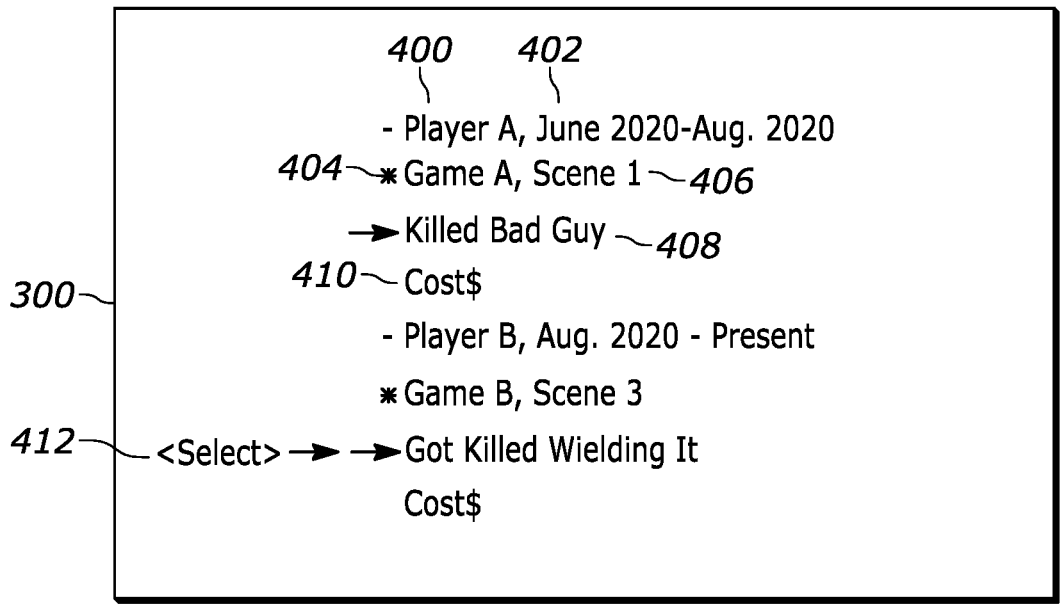

FIG. 4 illustrates a resulting UI that presents information on the NFT asset in a first presentation layout. The layout presents a list of owners 400 of the NFT, the period 402 for which each owner owned the NFT, the game 404 and game scene 406 associated with the purchase of the NFT by the respective owner, the event(s) 408 in the game associated with acquisition of the NFT, and the cost 410 the respective owner paid for the NFT. Note that the game 404, scene 406, and game event(s) 408 may be inferred at time of NFT acquisition to be the contemporaneous game, scene, and event at time of agreement to buy the NFT, or may be indicated by the buyer at time of purchase, or may be learned by a machine learning (ML) on the basis of importance of the event 408 according to learning based on a training set of ground truth important events in various games.

Figure 5:
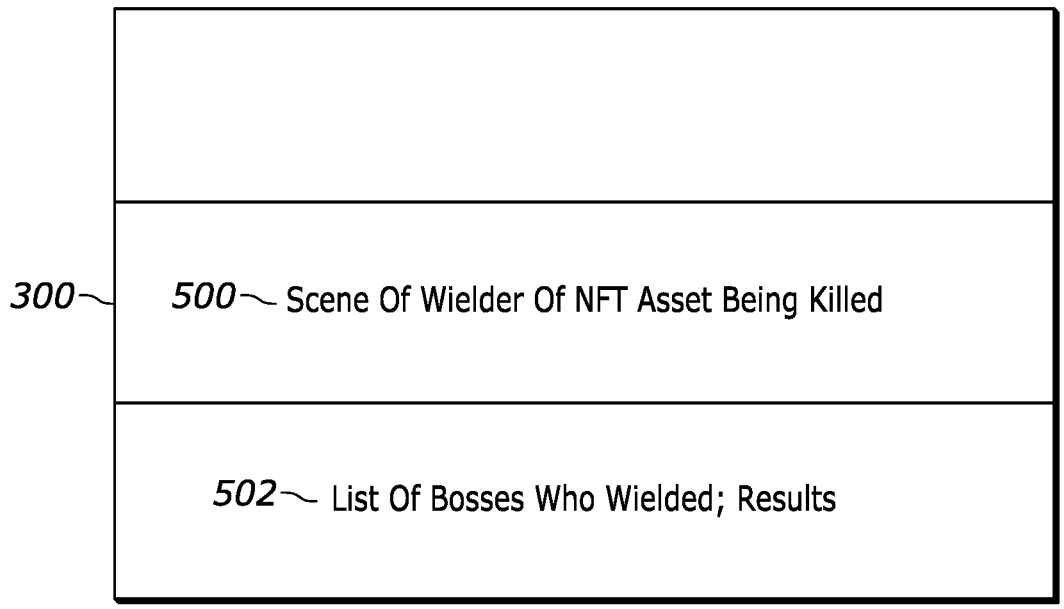

FIG. 5 illustrates further interactive features with the presentation of FIG. 4, which indicates at 412 that a user has selected to know more about how player B got killed wielding the digital asset. FIG. 5 presents an example in which the metadata indicating the game and scene from FIG.

4 is accessed to recall from storage (e.g., cloud storage) a recording of the event in question, typically from the recorded play session of the streamed game. The recording 500 is presented as shown, showing player B being killed while wielding the asset. If desired, a list 502 of gamers who also wielded the asset may be presented, along with their results at the same point of action as shown in the animated scene at 500.

Not all metadata in an NFT associated with a digital asset may be presented, to avoid over-complicating presentation to users. Present principles thus understand the need to create a clear, uncluttered story people care about, accounting for the complexity of knowledge they need to understand the presentation. To this end, machine learning (ML) may be employed to extract metadata from NFTs associated with computer game assets.

Figure 6:
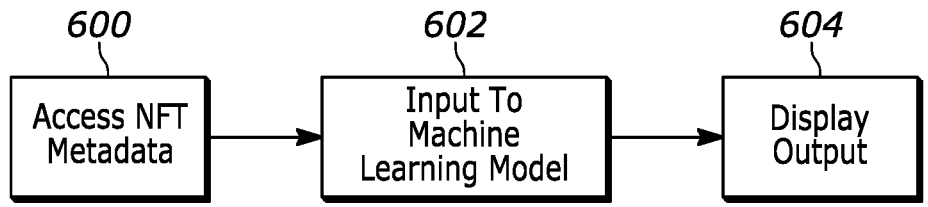

FIG. 6 illustrates. Commencing at block 600, NFT metadata associated with a selected digital asset such as a computer game asset is accessed, e.g., responsive to user input to know more about the asset. The metadata is input to a ML model at block 602. The ML model outputs those elements of the metadata that the model has learned to be of more importance than other elements, which output is displayed at block 604.

Figure 7:
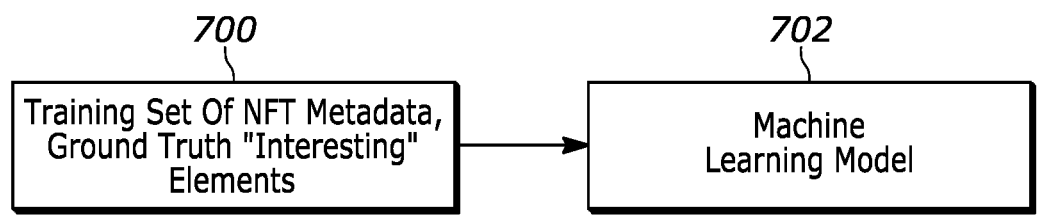

FIG. 7 illustrates that to train the ML model for FIG. 6, a training set 700 of NFT metadata and ground truth "interesting" or "important" elements therein as indicated by, e.g., an expert is input to a ML model 702 to train the model 702. Examples of such "interesting" or "important" metadata elements are presented in, e.g., FIGS. 4, 8, and 9.

Figure 8:
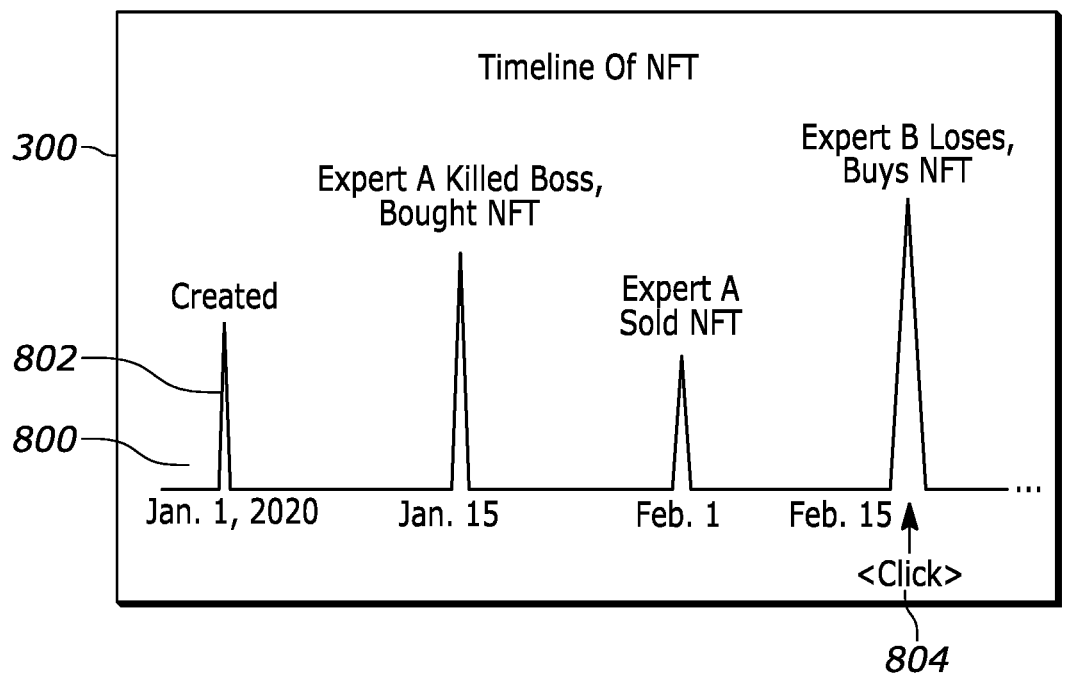

FIG. 8 illustrates another presentation of interesting aspects of a digital asset associated with a NFT as derived from NFT metadata. The presentation in FIG. 8 includes a timeline 800, with time increasing left to right along the x-axis. The timeline includes spikes 802 each of which represents an important event in the life of the NFT. For example, the first spike in FIG. 8 indicates the date (and if desired time) the NFT was created, while second spike indicates that the NFT was acquired by Expert A who killed a "boss" character using the underlying digital asset. The third spike indicates the date (and if desired time) the owner sold the NFT, while the fourth spike represents that Expert B acquired the NFT after losing in a game. Events between the third and fourth spikes in the life of the NFT, such as intervening sales, are omitted as not being considered by the ML model as being of importance. Note that the context of the purchase, such as whether the acquirer won or lost a game event, may be embedded in the metadata of the NFT. Thus, physical and/or virtual player location, time, other participants including game characters who fought the player, etc. may be encapsulated in the NFT metadata which in turn is captured on a block chain. When accessing the metadata, the block chain consequently is accessed to read the metadata and display elements of the metadata in a way that visualizes that timeline that user can control. The timeline 800 for example may be dropped into the profile of the viewing user, for who owned that NFT at various times to see "spikes" of "coolness".

Figure 9:
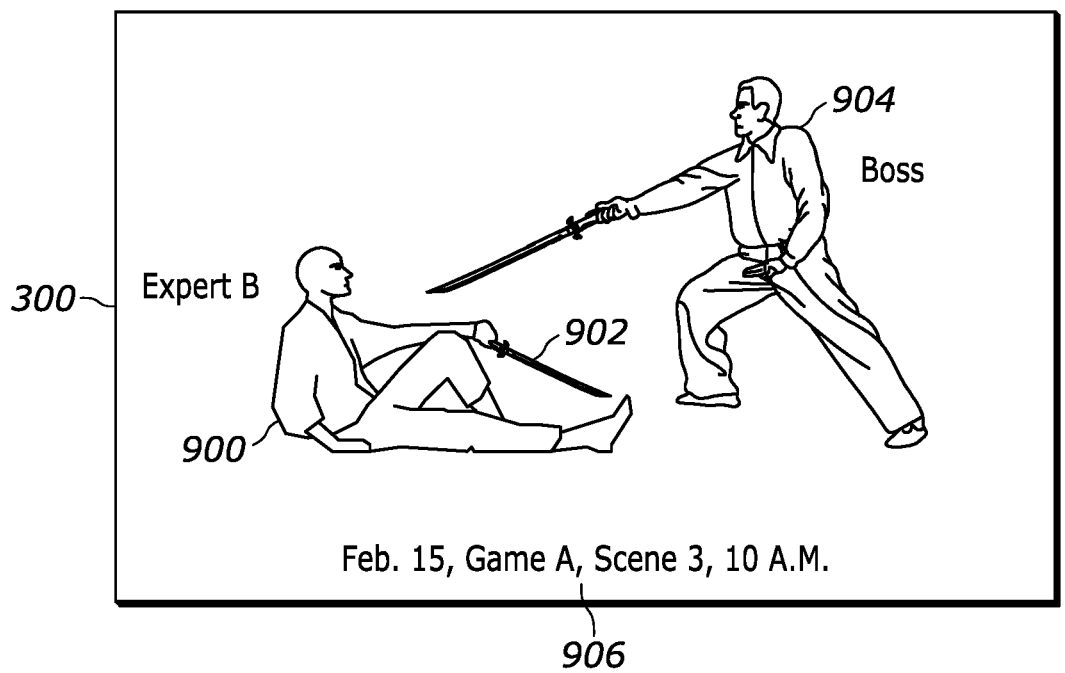

At 804 FIG. 8 indicates that a viewing user has clicked on a spike, in this case, the fourth spike indicating that the characters associated with expert B lost, an event associated with the NFT. FIG. 9 presents a resulting example UI illustrating the character 900 associated with expert B wielding the digital asset 902 associated with the NFT whilst losing to a Boss bad guy 904. The UI of FIG. 9 further may indicate at 906 the date, time, game name, and scene number of the game at which the action being depicted took place.

Presentation of NFT metadata may be audibly and/or visibly and/or tactilely using at least one appropriately configured computer display.

The NFT data structure can be linked to a gameplay data transport and processing system with which games report metadata about gameplay, such as activity start and end, which mechanics are being used by the player, where on the game map the user is located, etc. This data is sent from the game to our backend servers, which then use that data to power different features in the computer simulation ecosystem. In this way, the NFT logged information can access and record who was present in an event related to or spawning the NFT, corresponding activity metadata, etc. This information may be accessed from the NFT and sold to people who were present during game play or when the NFT was minted.

In addition to or alternative to buying an NFT, an NFT may be earned by a player executing an in-game task such as winning a tournament, slaying, or defeating an opponent, etc. The significance of the win can thus be frozen in time to record, e.g., a winner's first pro battle defeating reigning champion. The information included in or pointed to by the NFT may include a snapshot of the metaverse, which includes game statistics, indicating important aspects of the game such as an underdog defeating a champion, a come from behind win, etc. This information related to the recorded event can be dynamic and thus emerge as the game evolves for purposes of minting the NFT. The importance of events can be determined by how many people have accomplished a task, what sort of social value has been attributed to the task, etc.

The total record of the metaverse attending minting of an NFT may be maintained in an internal database with only memorable events being written to a block chain, with the block chain including a pointer to where the total record is stored.

Cross-platform use of the NFT and the benefits it affords may be facilitated. For example, an NFT minted on one game platform may be used with a different game platform by use of generic or common file formats such as .jpg or image files.

For special information pertaining to an asset underlying an NFT, such as a game car or game sword, attributes of the asset (car dented, sword notched) that may affect performance of the asset in-game may be transferred to a cloud server for reformatting from one game format (e.g., PlayStation) to another (e.g., Xbox). Or, the attributes may be encoded in the NFT by means of a pointer to the network location the attributes may be accessed, Using NFTs according to present principles, "impressions" may be tracked. User generated assets used to track "impressions" in our community to be transported—how is asset being used/circulated, tied to events. Impressions may include user interactions and as mentioned above an NFT may be minted from an in-game asset or an evet attached to an object, such as a major victory using a particular weapon.

While the particular embodiments are herein shown and described in detail, it is to be understood that the subject matter which is encompassed by the present invention is limited only by the claims.

What is claimed is:
1. A system comprising:
at least one computer medium that is not a transitory signal and that comprises instructions executable by at least one processor to:

input to at least one machine learning (ML) model at least one non-fungible token (NFT) representing at least one digital asset related to at least one computer simulation;
receive from the at least one ML model information from the at least one NFT indicating inferred interesting past aspects in a lifetime of the at least one NFT but not indicating all past aspects in the lifetime of the at least one NFT; and
present on at least one computer display the information indicating the inferred past interesting aspects;
wherein the information is presented as part of at least one user interface (UI) that presents a visual timeline with time increasing along an X axis, the visual timeline comprising upward spikes according to a Y axis, each spike representing an important event in the at least one NFT as inferred by the at least one ML model.

2. The system of claim 1, comprising the at least one processor.

3. The system of claim 1, wherein the information from the at least one NFT is derived from some but not all metadata associated with the at least one NFT as stored in a block chain of the at least one NFT.

4. The system of claim 1, wherein the information presented as part of the at least one UI indicates one or more past owners of the at least one NFT.

5. The system of claim 4, wherein the at least one UI indicates a respective period for which the one or more past owners owned the at least one NFT.

6. The system of claim 4, wherein the at least one UI indicates a respective game and/or game scene associated with acquisition of the at least one NFT by a respective past owner.

7. The system of claim 4, wherein the at least one UI presents a selector that is selectable to present a recording of a past play session of a computer game, the past play session being one in which the at least one digital asset was used.

8. The system of claim 4, wherein the at least one UI on which the visual timeline is presented is a first UI, and wherein the instructions are executable to:
responsive to a selection from the first UI, present a second UI surfacing a list of computer gamers who wielded the at least one digital asset while playing a computer game.

9. The system of claim 1, wherein the at least one UI on which the visual timeline is presented is a first UI, and wherein the instructions are executable to:
receive selection of a first spike in the visual timeline; and
responsive to the selection, present a second UI presenting information associated with the first spike.

10. A method comprising:
inputting to at least one machine learning (ML) model at least one training set of data comprising first metadata of non-fungible tokens (NFT) associated with computer simulation assets and ground truth interesting elements therein;
training the at least one ML model using the training set;
subsequent to training, inputting to the at least one ML model at least one NFT comprising second metadata; and
presenting third metadata output by the at least one ML model for a user to visualize important events in a life of the at least one NFT, the third metadata presented on at least one computer display as part of a first user interface (UI), the first UI presenting a visual timeline with time increasing along an X axis, the visual timeline comprising upward spikes according to a Y axis, each spike representing an important event in the at least one NFT as inferred by the at least one ML model.

11. The method of claim 10, wherein the ground truth interesting elements comprise name of at least one owner of the at least one NFT, name of at least one computer game, and activity in the at least one computer game.

12. The method of claim 10, wherein the first UI indicates at least some past interesting owners of the at least one NFT but not all past owners of the at least one NFT.

13. The method of claim 12, wherein the first UI indicates a respective period for which each respective past interesting owner owned the at least one NFT.

14. The method of claim 12, wherein the first UI presents a selector that is selectable to initiate the playing of a past recording of a respective game and/or game scene associated with the at least one NFT.

15. The method of claim 12, comprising:
responsive to a selection from the first UI, presenting a second UI surfacing a list of computer gamers who wielded the at least one digital asset while playing a computer game.

16. The method of claim 10, comprising:
receiving selection of a first spike in the visual timeline; and
responsive to the selection, presenting a second UI presenting information associated with the first spike.

17. An assembly comprising:
at least one display; and
at least one processor programmed with instructions to:
present on the at least one display a visual history of interesting past events for at least one non-fungible token (NFT), the at least one NFT derived to represent at least one digital asset in a computer game, the visual history of interesting past events not showing all past events for the at least one NFT, the visual history comprising a visual timeline with time increasing along an X axis, the visual timeline comprising spikes according to a Y axis, each spike representing a respective interesting event related to the at least one NFT as inferred by the at least one ML model.

18. The assembly of claim 17, wherein the at least one processor is programmed with instructions to:
provide, as input to at least one machine learning (ML) model, data associated with the at least one NFT; and
receive, as output from the at least one ML model, inferred interesting past events for the at least one NFT, the inferred interesting past events used for the visual history.

19. The assembly of claim 17, wherein the at least one processor is programmed with instructions to:
receive a selection of a first spike on the visual timeline; and
responsive to the selection, present additional information associated with the first spike.

20. The assembly of claim 17, wherein one or more of the interesting past events indicated by a respective spike on the visual timeline relates to a change in ownership of the at least one NFT.

* * * * *